United States Patent [19]
Benedict

[11] 3,883,637
[45] May 13, 1975

[54] CATALYTIC METHOD OF PURIFICATION OF AIR FOR MOTOR VEHICLE PASSENGER COMPARTMENT

[75] Inventor: John W. Benedict, Louisville, Ky.

[73] Assignee: Girdler Chemical, Inc., Louisville, Ky.

[22] Filed: June 25, 1973

[21] Appl. No.: 373,396

Related U.S. Application Data

[63] Continuation-in-part of Ser. No. 128,925, March 29, 1971, abandoned, which is a continuation-in-part of Ser. No. 779,030, Nov. 26, 1968, abandoned.

[52] U.S. Cl............... 423/230; 23/288 F; 55/73; 55/74; 55/267; 55/316; 55/387; 55/524; 98/2; 98/11; 423/244; 423/571
[51] Int. Cl............................................. B01d 46/00
[58] Field of Search ......... 423/242, 244, 560, 571, 423/572, 573, 230; 55/74, 387, DIG. 30, 68, 73, 316, 524, 514; 252/410, 411 S, 444, 445, 447, 461, 456, 476; 23/288 R, 288 F; 98/2, 11

[56] References Cited
UNITED STATES PATENTS

| | | | |
|---|---|---|---|
| 2,083,894 | 6/1937 | Connolly | 423/244 X |
| 2,257,638 | 9/1941 | Moore | 55/387 X |
| 2,362,669 | 11/1944 | Schulze | 423/244 X |
| 2,551,905 | 5/1951 | Robinson | 423/244 X |
| 2,577,606 | 12/1951 | Conley | 55/387 X |
| 2,580,068 | 12/1951 | Beekley et al. | 423/244 |
| 2,881,854 | 4/1959 | Vehre, Jr. | 55/316 |
| 2,920,050 | 1/1960 | Blacet et al. | 55/74 X |
| 2,951,551 | 9/1960 | West | 55/316 |
| 2,963,441 | 12/1960 | Dolian | 55/74 X |
| 3,189,406 | 6/1965 | Storp et al. | 423/244 |
| 3,193,987 | 7/1965 | Manes et al. | 55/72 |
| 3,217,715 | 11/1965 | Berger et al. | 55/387 X |
| 3,416,293 | 12/1968 | Alexander | 55/73 |
| 3,475,133 | 10/1969 | Wartenberg | 423/242 |
| 3,544,507 | 12/1970 | Lloyd | 55/387 X |
| 3,645,072 | 2/1972 | Clapham | 55/387 |
| 3,721,066 | 3/1973 | Teller | 55/71 |

Primary Examiner—Bernard Nozick

[57] ABSTRACT

A method of using catalytically active filter element containing combined copper and combined chromium is used to remove odorous organic sulfur compounds from air moving rapidly through the ventilation conduit system of a motor vehicle and into the passenger compartment thereof.

6 Claims, 1 Drawing Figure

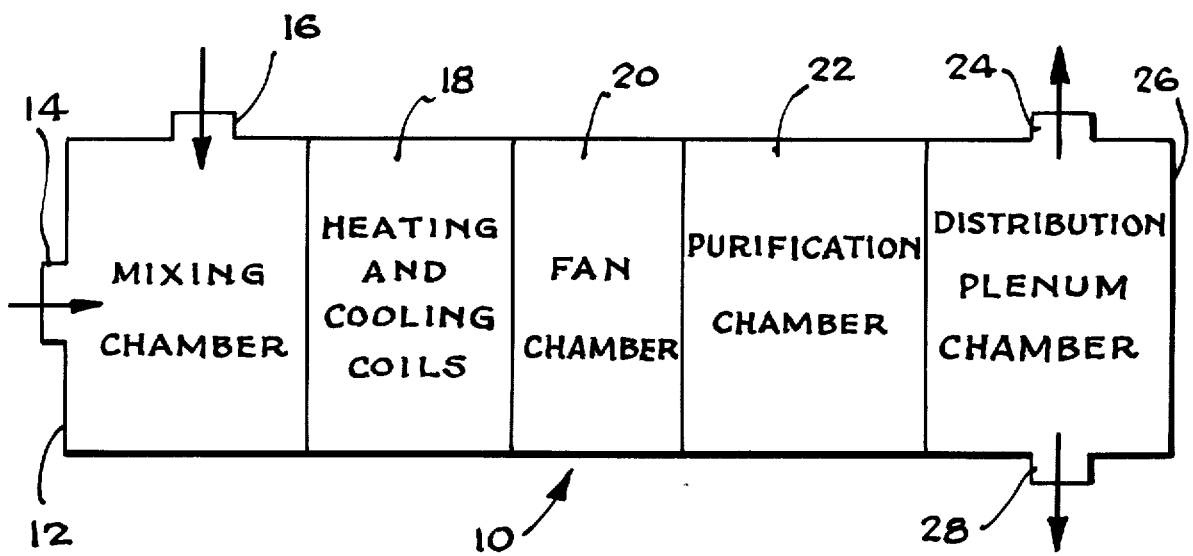

CATALYTIC METHOD OF PURIFICATION OF AIR FOR MOTOR VEHICLE PASSENGER COMPARTMENT

This application is a continuation-in-part of Ser. No. 128,925, filed Mar. 29, 1971 which was a continuation-in-part of Ser. No. 779,030, filed Nov. 26, 1968, now both abandoned.

This invention relates to an air purifying system for motor vehicles. More particularly, this invention relates to a method for removing odorous organic sulfur compounds and harmful gases from the air entering a motor vehicle passenger compartment through a ventilation conduit system. The ventilation conduit system may be a heating system, an air conditioning system or other conduit system for the admission of outside air and recirculated air into the passenger compartment.

The air entering the passenger compartments of motor vehicles such as passenger cars, trucks, buses, trains, etc. often carries odorous, or toxic, sulfur-containing gases or vapors. This is especially true in industrial areas where the emissions from oil refineries, steel mills, coking plants, sewage disposal plants, and incinerators, for example, escape into the atmosphere.

Filter elements for ventilation conduit systems for motor vehicles are more or less conventional. The space velocity of the air as it passes through the filter element is very high because of the large volume of air relative to the small volume of the filter element necessitated by the small space available in most vehicles for ventilation systems. These systems usually provide a filter element which removes suspended particles (e.g., dust) from the air being circulated or recirculated to the motor vehicle passenger compartment. Such conventional systems, however, are mere mechanical devices and have the disadvantage that they do not remove undesirable vapors or gases from the air. Other filter elements containing activated charcoal have been used to deodorize air entering automobile passenger compartments; these have not been effective, however, in removing odorous organic sulfur compounds, especially at the very high space velocities of the air within the filter element.

Now it has been found that a filter element containing combined copper and combined chromium on activated charcoal is effective at such high space velocities.

It is, therefore, an object of this invention to provide a method for purifying the air entering the passenger compartment of a motor vehicle from the outside through a ventilation conduit system.

It is a further object of this invention to provide a method for purifying the air recirculating through the passenger compartment of a motor vehicle through a ventilation conduit system.

It is still a further object of this invention to provide a method for removing air-borne sulfur compounds, including odorous organic sulfur compounds, from such outside or recirculated air while it is rapidly passing through the filter element of a passenger vehicle ventilation conduit.

It is another object of this invention to provide for removing air-borne sulfur compounds from said air by a method which does not require the use of expensive noble metal catalysts.

These and other objects will be apparent from the following disclosure taken in conjunction with the attached drawing.

In accordance with the above objects this invention provides for the removal of odorous air-borne sulfur compounds from air entering a motor vehicle passenger compartment through a ventilation conduit system by a method which consists essentially of passing such air through a catalytically active filter element mounted within the conduit, said filter element consisting essentially of activated charcoal on which there is deposited from about 0.1 percent to about 8 percent by weight of combined copper and from about 0.05 percent to about 5 percent by weight of combined chromium, the ratio of copper to chromium being from about 1:1 to about 8:1; and the hourly space velocity of the air as it passes through the element being from about $5 \times 10^4$ to about $1.5 \times 10^6$.

The organic sulfur compounds removed by the method of this invention include mercaptans, organic sulfides, thiophene compounds, thioethers and organic sulfoxides. It is postulated that the sulfur-containing moiety of these compounds is converted to hydrogen sulfide by the catalytically active copper and chromium compounds and the hydrogen sulfide is adsorbed by the charcoal.

A better understanding of the invention may be had by reference to the drawing wherein the labeled boxes represent the various sections of a conventional conduit system 10 for the ventilation of a motor vehicle passenger compartment.

Mixing chamber 12 is a conduit through which outside air and recirculated air flows, the direction of which is shown by arrows. The outside air is introduced, by ram action and by suction, into mixing chamber 12 by means of one or more inlet ducts 14 and recirculated air is drawn into the mixing chamber through one or more ducts 16 in communication with the passenger compartment by means of an axial flow fan or a centrifugal fan situated downstream from the mixing chamber. Suitable damper controls regulate the amount of outside air supplied to the mixing chamber.

The heating and cooling coils 18 are optional in a ventilation conduit system. If the air is to be heated, hot radiator fluid from the vehicle is circulated through the heating coil and the temperature is regulated to achieve the desired air temperature. In warm weather, the heating coil is shut off and a refrigerant may be circulated through the cooling coil to cool the air to the desired temperature.

The fan chamber 20 houses an electrically powered fan which draws the air through the ventilation conduit system.

The purification chamber 22 houses a dust filter to mechanically remove particles, and the catalytically active filter element to chemically remove vapors. The dust filter may be formed of glass fiber or other suitable mechanical filtering media. The catalytically active filter element is usually located downstream from the dust filter to protect the charcoal therein from becoming clogged with dust.

The distribution plenum chamber 26 has discharge outlet ducts 24 and 28 for passage of the air from the ventilation system into the passenger compartment. These ducts may consist of one or more defroster ducts and one or more ducts communicating with the passenger compartment proper.

The removal of odorous organic sulfur compounds and harmful gases is accomplished satisfactorily by the method of this invention without regard to the coil location. Thus, the heating and cooling coils 18 may be located downstream from purification chamber 22. In some instances this arrangement is to be preferred.

The catalytically active filter element is mounted in purification chamber 22 between screens or other supporting members. The screens may be shaped into the form of a box which may be removed for ease of replacement of the filter element.

The activated charcoal containing the combined copper and combined chromium may be formed into a porous filter medium, such as a briquette, by applying a suitable adhesive, such as polyvinyl acetate, polyvinyl alcohol or polyethylene, and pressing the material into a thin slab, such as 10 inches × 10 inches × 1 inch. The charcoal may also be poured in particulate form into the space defined by the screens within the purification chamber described above. For ease of removal and replacement, however, the filter medium or filter element may be in the briquette form or in the form of a bag filled with the charcoal. The bag may be made of gauze or other loosely woven cloth. The shape of the bag will be such, or course, that it may be fitted easily between the above-mentioned screens.

The forms of combined copper contemplated in this invention are cuprous and cupric oxide, cuprous and cupric chromate, cuprous and cupric dichromate, cuprous and cupric chromite and mixtures thereof. The forms of combined chromium contemplated are chromium trioxide, chromic oxide, the aforementioned chromates, dichromates, chromites, mixtures thereof.

Cupric oxide and the chromium oxides usually constitute a major (i.e., greater than 50 percent by weight) or substantial (i.e., preponderant) portion of the combined copper and combined chromium content in the filter element used in this invention.

The amount of combined copper and combined chromium present in the filter element used in this invention may be, as mentioned above, within the ranges of from about 0.1 to about 8 percent by weight and from about 0.05 to about 5 percent by weight, respectively. Usually, the copper content is from about 0.5 to about 5 percent and the chromium content is from about 0.25 to about 3 percent. Preferably, these values are from about 1 to about 3 percent and from about 0.5 to about 2.5 percent, respectively. These values are expressed in terms of free metal. The preferred range of copper oxide content is from about 2 to about 7.5 percent and the preferred range of chromium oxide content is from about 1 to about 3 percent. A particularly preferred range of copper oxide content is from about 2 to about 4 percent and a particularly preferred range of chromium oxide content is from about 1 to about 2 percent. A filter element in which the molar ratio of copper to chromium is from about 2:1 to about 8:1 is especially preferred. Most preferred is a copper to chromium molar ratio from about 2:1 to about 2.5:1.

The filter element containing the activated charcoal and the combined copper and combined chromium permits air to pass through at a rate of from about 100 to about 300 cubic feet per minute while various odorous constituents, such as $H_2S$, are adsorbed from the air by the activated charcoal. A complete change of air within the passenger compartment of most standard size automobiles is thereby made once or twice a minute. The porosity of the filter element is important and, preferably, should be such that at an hourly space velocity of about $2.3 \times 10^5$ at ambient temperatures, the pressure drop does not exceed about 0.5 inch of water. The maximum pressure drop contemplated at this air flow is about 4.5 inches of water. To achieve the requisite porosity the particle size of the activated charcoal or carbon is preferably 4 × 8 mesh (i.e., having particles from 4 to 8 mesh) although a mesh as small as 8 × 30 is acceptable for some flow rates. Thus an activated charcoal having a mesh size within the range of from about 4 to about 30 is contemplated for use in this invention. Best results are obtained when the particle size distribution in a filter element is rather narrow. Examples of activated charcoals having an acceptable particle size distribution include those having a 4 × 6 mesh, 12 × 28 mesh, 12 × 30 mesh, and 12 × 16 mesh as well as the 4 × 8 and 8 × 30 mentioned above.

The size of the filter element will be determined, for the most part, by the size of the ventilation conduit in the motor vehicle, the pulling power of the fan used in the ventilation system, and the porosity of the filter element. The area will usually be from about 80 to 200 square inches and the thickness will be from about 0.25 to about 1 inch, preferably 0.5 to 1 inch.

The space velocity of the air passing through the filter element may be calculated from the volume of the element and the volume of air passing through the element per unit of time. Thus, the hourly space velocity of air passing through the filter element at a rate of 100 cubic feet per minute is from about $5 \times 10^4$ to about $5 \times 10^5$. At an air flow of 300 cubic feet per minute the hourly space velocity is from about $1.5 \times 10^5$ to about $1.5 \times 10^6$. The contemplated hourly space velocity is, therefore, within the range of from about $5 \times 10^4$ to about $1.5 \times 10^6$. Preferably, the hourly space velocity will be from about $1 \times 10^5$ to about $5 \times 10^5$.

The source of the activated charcoal or carbon is not critical for the purpose of this invention. A charcoal prepared from such diverse materials as coal or petroleum or coconut shells, for example, may be used. "Charcoal" and "carbon" are used interchangeably in this application.

The combined copper and combined chromium is deposited on the activated charcoal of the filter element by impregnating the charcoal with an aqueous solution prepared from a copper salt such as basic copper carbonate, an ammonium salt such as ammonium carbonate and chromium trioxide. Any excess solution is removed from the charcoal and the charcoal is dried. The resulting solid is a copper oxide- and chromium oxide-impregnated activated charcoal. The copper oxide and chromium oxide usually constitute the larger portion of the combined copper and combined chromium content but the other forms mentioned above will usually be present in various amounts.

The following description illustrates a preferred procedure for producing the filter element:

EXAMPLE I

To a solution of 20 lbs. of ammonium carbonate in 60 lbs. of water was added 21.5 lbs. of aqua ammonia (28 percent). Then 30 lbs. of basic copper carbonate was added in small portions with good stirring while the temperatuure of the solution was held between 95° and 105°F., the addition requiring about 2 hours. Air was blown through the solution until the sulfuric acid test for cuprous ions was negative. The resulting solution was filtered and to it was added a solution of 3.5 lbs. of chromic acid ($CrO_3$) in 10 lbs. of water. Then sufficient water was added to make 200 lbs. of solution. To 10 gallons of this solution was added 10 gallons (approximately 42 lbs.) of 4 × 8 mesh activated charcoal and stirring was continued until the evolution of bubbles ceased and for an hour longer. The resulting suspension was filtered and the residual charcoal was dried in a rotating drum dryer at 250°F. and an air flow of 15 cubic feet per minute for 2 hours.

The following examples describe typical preparations of the filter element in briquette form:

EXAMPLE II a. 30 lbs. of an aqueous emulsion of polyvinyl acetate, 50 percent solids (UCAR WC-130 of Union Carbide Corporation), was diluted with 30 lbs. of water. Then 100 lbs. of 4 × 6 mesh activated carbon (treated according to the procedure of Example I) was mixed thoroughly with the emulsion and stirred until the mixture became tacky. The product was then placed in 10 inches × 10 inches × 1 inch molds and pressed firmly to compact the material. The molded shapes were dried at 140°F. for 15 hours to set the binder. The shapes were sufficiently rigid and strong to be used in the purification chamber between the screens without collapse or disintegration. If 12 × 28 mesh carbon is used, more water (e.g. 50 lbs.) is required, but otherwise the procedure is the same. b. Alternatively, the filter element can be produced from 100 lbs. of activated carbon (treated according to the procedure of Example I) and 15 lbs. of powdered polyethylene (Microthene of U.S. Industrial Chemicals) by dry blending the components, depositing the mixture in molds and curing at about 250°F. for a time sufficient to allow all cross-sectional areas of the pieces to come up to temperature. With a 1-inch thickness, this can be achieved in about 15–30 minutes.

Activated carbon elements made according to the foregoing procedures have strong bonds between the carbon particles without lowering the capacity of the activated carbon to adsorb vapors.

The following examples illustrate the method of this invention:

EXAMPLE III

Air containing 10 parts per million of hydrogen sulfide is passed at 300 cubic feet per minute through a filter element prepared from 12 × 30 mesh activated charcoal treated according to the general procedure of Example I. The volume of the filter element is about 81 cubic inches or about 0.047 cubic feet and the hourly space velocity of the air within the element is, therefore, about $3.8 \times 10^5$. The hydrogen sulfide is removed satisfactorily.

EXAMPLE IV

A 4 × 8 mesh activated charcoal (prepared from coal) is treated according to the general procedure of Example I to give a particulate charcoal containing 2.24 percent copper and 0.78 percent chromium (Cu/Cr molar ratio of 2.35:1). This is then poured into the space within a passenger automobile heater conduit defined by a pair of 8 inch by 11 inch screens spaced 0.75 inch apart and mounted downstream from a dust filter and heating coil. The automobile is then operated in an area in which sulfur-containing gases from an oil refinery are present in the air. These gases include mercaptans and thiophenes. Removal of these gases as the air passes through the treated activated charcoal element is satisfactory.

EXAMPLE V

The general procedure of Example IV is followed except that the activated charcoal filter element containing copper and chromium is placed in the conduit of an air conditioning system in a passenger car. The charcoal filter element is mounted upstream from the cooling coil in the conduit. Removal of the sulfur-containing gases as the air passes through the charcoal filter element is satisfactory.

Although certain preferred embodiments of the invention have been disclosed for purposes of illustration it will be evident that various changes and modifications can be made therein without departing from the spirit and scope of this invention.

I claim:

1. A method for removing air-borne sulfur compounds from air entering a motor vehicle passenger compartment through a ventilation conduit system, said method consisting of essentially of the steps of impregnating a selected quantity of activated charcoal with selected copper compounds in amounts such that said activated charcoal contains from about 0.5 percent to about 5 percent by weight as free copper and from about 0.25 percent to about 3 percent by weight as free chromium in proportions such that the molar ratio of copper to chromium is from about 1:1 to about 8:1, mixing the impregnated charcoal so formed with an emulsion of liquid and a soluble thermal setting binder consisting essentially of polyvinyl acetate and solvent until the mixture becomes tacky; placing said mixture in a mold of selected configuration, pressing the mixture to form a briquette, and heating the briquette as formed to set the binder to form said impregnated charcoal into a catalytically active filter element, and mounting said filter element in the ventilation conduit of said vehicle and passing said air through the filter element at an hourly space velocity of from about 5 times 10 to the forth to about 1.5 times ten to the sixth.

2. The method of claim 1 wherein the combined copper and combined chromium are deposited on the charcoal by impregnating the charcoal with an aqueous solution prepared from basic cupric carbonate, ammonium carbonate, and chromium trioxide, removing excess solution from the charcoal, and drying the impregnated charcoal.

3. The method of claim 1 wherein the hourly space velocity of the air is from about $1 \times 10^5$ to about $5 \times 10^5$.

4. The method of claim 1 wherein the maximum pressure drop is about 0.5 inch of water.

5. The method of claim 1 wherein the hourly space velocity is from about $1.19 \times 10^5$ to about $1.19 \times 10^6$.

6. The method of claim 5 characterized further in that at an hourly space velocity of about $2.38 \times 10^5$ the maximum pressure drop across the filter element is about 4.5 inches of water.

* * * * *